United States Patent
Hochbaum (10) Patent No.: US 7,274,881 B2
(45) Date of Patent: Sep. 25, 2007

(54) OPTICAL LINE TERMINAL AND METHOD THAT STORE THE IDENTITY NUMBERS OF A NUMBER OF OPTICAL NETWORK TERMINALS THAT ARE ASSOCIATED WITH A SINGLE NETWORK END POINT

(75) Inventor: Shimon Hochbaum, Santa Rosa, CA (US)

(73) Assignee: Tellabs Petaluma, Inc., Petalum, CA (US)

( * ) Notice: Subject to any disclaimer, the term of this patent is extended or adjusted under 35 U.S.C. 154(b) by 108 days.

(21) Appl. No.: 10/617,982

(22) Filed: Jul. 10, 2003

(65) Prior Publication Data

US 2005/0008372 A1    Jan. 13, 2005

(51) Int. Cl.
*H04B 10/00* (2006.01)
(52) U.S. Cl. .................... 398/162; 398/140
(58) Field of Classification Search ............ 398/66–70, 398/58, 60, 9, 36, 168, 162, 153, 16, 17, 398/22, 99, 100, 140, 71–72; 370/219, 220, 370/227, 228; 340/3.42–44, 514, 505; 379/37; 455/521; 717/172
See application file for complete search history.

(56) References Cited

U.S. PATENT DOCUMENTS

| | | | |
|---|---|---|---|
| 6,591,389 B1 * | 7/2003 | Daudelin et al. ........... 714/733 |
| 6,646,777 B2 * | 11/2003 | Qin et al. .................... 359/281 |
| 6,748,550 B2 * | 6/2004 | McBrearty et al. ............ 714/4 |
| 2002/0021472 A1 * | 2/2002 | Nakaishi ..................... 359/168 |
| 2003/0012485 A1 * | 1/2003 | Neeley et al. ................. 385/16 |
| 2003/0078947 A1 * | 4/2003 | Garg et al. .................. 707/204 |
| 2003/0152389 A1 * | 8/2003 | Sala et al. ..................... 398/98 |
| 2003/0177215 A1 * | 9/2003 | Sutherland et al. ......... 709/223 |
| 2004/0031030 A1 * | 2/2004 | Kidder et al. ................ 717/172 |
| 2005/0013609 A1 * | 1/2005 | Fike et al. ....................... 398/9 |

OTHER PUBLICATIONS

International Telecommunication Union, Series G: Transmission Systems and Media, Digital Systems and Networks, "Broadband Optic al Access Systems Based on Passive Optical Networks (PON)", ITU-T Recommendation G.983.1, Oct. 1998, pp. 1-112, [no p. 78], and 1 sheet ITU-T Recommendations Series.

* cited by examiner

*Primary Examiner*—Shi K. Li
*Assistant Examiner*—Quan-Zhen Wang
(74) *Attorney, Agent, or Firm*—Mark C. Pickering (57) ABSTRACT

The memory of the optical line terminal (OLT) of a broadband passive optical network (BPON) is increased to store, in addition to an active identity number, such as the serial number, of the current optical network terminal (ONT) connected to a network end point, a standby identity number, such as the serial number, of a replacement optical network terminal (ONT) when upgrades are requested by the end users, or partial or total failures are reported by the end users.

12 Claims, 4 Drawing Sheets

OPTICAL LINE TERMINAL AND METHOD THAT STORE THE IDENTITY NUMBERS OF A NUMBER OF OPTICAL NETWORK TERMINALS THAT ARE ASSOCIATED WITH A SINGLE NETWORK END POINT

BACKGROUND OF THE INVENTION

1. Field of the Invention

The present invention relates to an optical line terminal (OLT) and, more particularly, to an OLT that stores the identity numbers of a number of optical network terminals (ONTs) that are associated with a single network end point.

2. Description of the Related Art

The access leg of a communications network is the segment of the network that connects a central office to the end users. A passive optical network (PON) is an access leg that optically transmits data between two points, and requires no power for the data to pass between the two points. Active optical networks also optically transmit data between two points, but require power to pass the data between the two points.

One common architecture of the access leg of a passive as well as an active optical network is a point-to-multipoint architecture. In a point-to-multipoint architecture, an optical line terminal (OLT) in the central office transmits information to, and receives information from, a number of optical devices, such as optical network terminals (ONTs).

There are a number of types of point-to-multipoint architectures used in the access leg of a network that differ by where the ends of the optical fibers of the network (the network end points) are located. For example, a Fiber to the Cabinet (FTTCab) access leg is a point-to-multipoint architecture where the end points of the optical fibers are located in a cabinet in a neighborhood. Existing copper lines are typically used to make the network connection from the cabinet to the end users.

In addition, a Fiber to the Building/Curb (FTTB/C) access leg is a point-to-multipoint architecture where the end points of the optical fibers are located at the curb or in the building. As before, existing copper lines are normally used to make the network connection from the curb or building to the end users.

A Fiber to the Home (FTTH) access leg is a point-to-multipoint architecture where the end points of the optical fibers extend to the end users, such as being connected to the exterior wall of an end user's residence or office. The FTTH access leg provides a continuous optical connection between the OLT and the end users.

In addition to the architecture, optical networks are also commonly described by the type of protocol used on the network or the services provided by the network. For example, an FTTH PON which utilizes the asynchronous transfer mechanism (ATM) protocol is often referred to as an APON or an ATM-PON.

APONs use a single fiber to pass two light frequencies. The two frequencies include a downstream light frequency that is utilized to transmit voice, data, video, and network signals from the OLT to the end users in an ATM format, and an upstream light frequency that is utilized to transmit voice, data, and network signals from the end users to the OLT in an ATM format.

Other variations include an Ethernet PON (EPON) that utilizes the Ethernet protocol, a broadband PON (BPON) which is an extension of an APON, and a gigabit PON (GPON) that combines aspects of an EPON and a BPON (utilizes the ATM protocol as well as non-ATM protocols, such as Ethernet and video protocols). A BPON utilizes two light frequencies to transmit and receive voice, data, and network signals in an ATM format, and a third light frequency to transmit video signals downstream to the end users in a non-ATM format (as an overlay).

Figure 1:
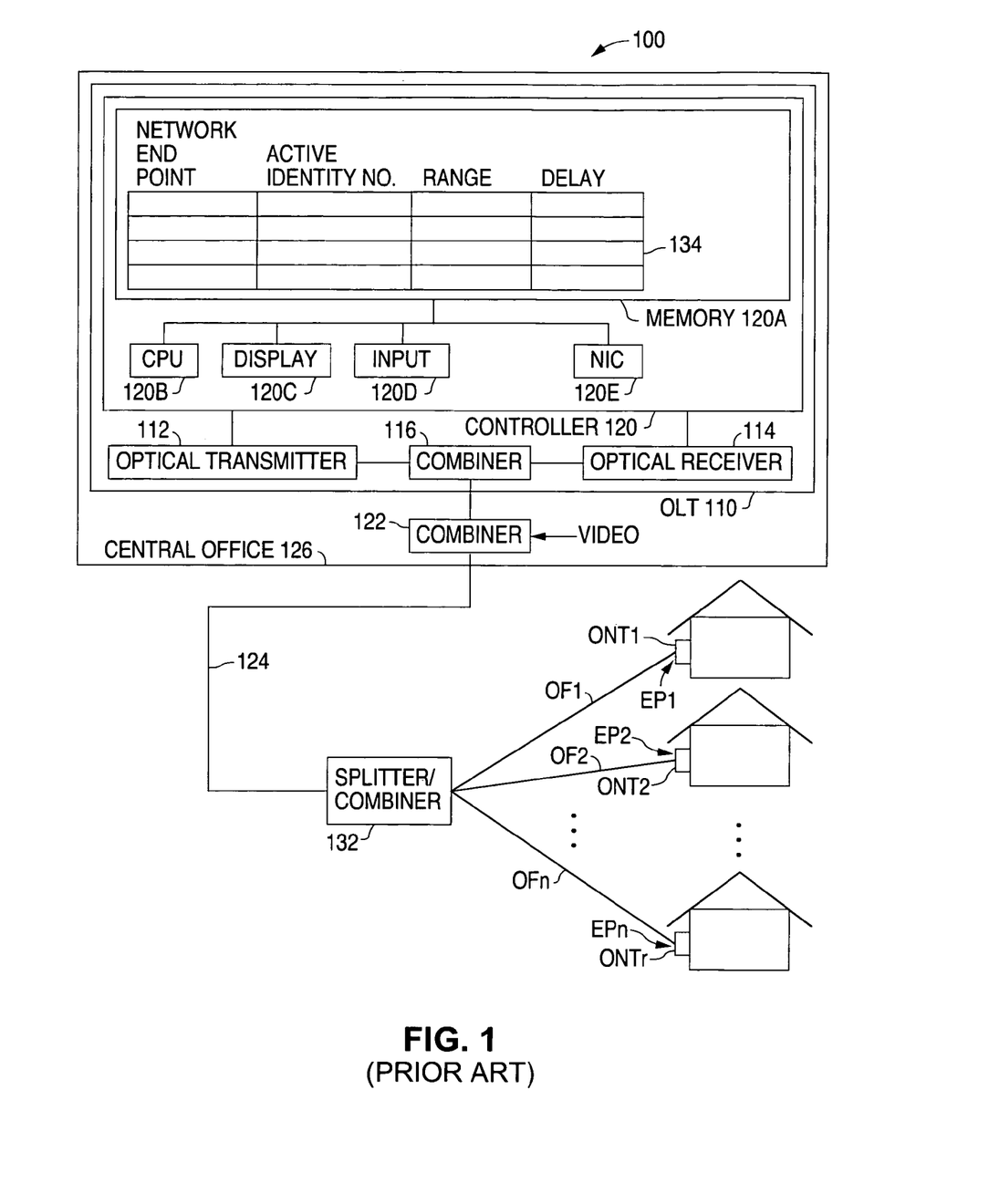
FIG. 1 is a block diagram illustrating the access leg of a prior art point-to-multipoint BPON 100.

FIG. 1 shows a block diagram that illustrates the access leg of a prior art point-to-multipoint BPON 100. As shown in FIG. 1, BPON 100, which can be implemented in accordance with the specifications stated in International Telecommunications Union (ITU) Recommendation G.983.1, which is hereby incorporated by reference, includes an optical line terminal (OLT) 110.

OLT 110 includes an optical transmitter 112, an optical receiver 114, and a wave division multiplexed (WDM) combiner 116. Optical transmitter 112 receives first downstream information, such as voice, data, and network signals, and transmits a sequence of first downstream light pulses that represents the first downstream information to combiner 116 which, in turn, outputs the first downstream light pulses. Optical transmitter 112 transmits the first downstream light pulses to combiner 116 at a wavelength in the range of, for example, 1480-1500 nm.

Combiner 116 receives a sequence of upstream light pulses, and outputs the upstream light pulses to optical receiver 114 which, in turn, converts the upstream light pulses into upstream information, such as voice, data, and network signals. Optical receiver 114 receives the sequence of upstream light pulses from combiner 116 at a wavelength in the range of, for example, 1260-1360 nm.

In addition, OLT 110 includes a controller 120 that is connected to optical transmitter 112 and optical receiver 114. As shown in FIG. 1, controller 120 includes a memory 120A that has a large number of memory cells that store software and data. The software includes an operating system and a set of program instructions. The operating system can be implemented with, for example, the Linux operating system, although other operating systems can alternately be used.

Controller 120 further includes a central processing unit (CPU) 120B that is connected to memory 120A. CPU 120B, which can be implemented with, for example, a 32-bit processor, executes the program instructions to operate on and transform the data. CPU 120B prepares the downstream information for optical transmitter 112, and receives the upstream information from optical receiver 114.

In addition, controller 120 includes a display system 120C that is connected to CPU 120B. Display system 120C, which can be remotely located or portable, allows images to be displayed to system personnel which are necessary for the system personnel to interact with the program. Controller 120 also includes an input system 120D which is connected to CPU 120B. Input system 120D, which also can be remotely located or portable, allows the system personnel to interact with the program.

Further, controller 120 includes a network interface card (NIC) 120E which is connected to memory 120A and CPU 120B. NIC 120E provides a connection to a networked computer to transfer information, such as status information, out of controller 120, and to transfer information, such as program instructions, into controller 120.

As further shown in FIG. 1, BPON 100 additionally includes a WMD combiner 122 that is connected to combiner 116, and a fiber optic cable 124 that is connected to combiner 122. Combiner 122 combines a sequence of transmitted light pulses that represent (overlaid) video signals with the sequence of light pulses output from transmitter 112 via combiner 116. The light pulses representing the video signals can be transmitted at a wavelength in the range of, for example, 1550-1560 nm. In the example shown in FIG. 1, OLT 110 and combiner 122 reside in a central office 126.

As further shown in FIG. 1, BPON 100 also includes a passive optical splitter/combiner 132 that is connected to fiber optic cable 124, and a series of optical fibers OF1-OFn that are connected to splitter/combiner 132. Splitter 132 splits the downstream light pulses into a sequence of split downstream light pulses that are output to the series of optical fibers OF1-OFn. Combiner 132, on the other hand, combines a series of end user upstream light pulses from the series of optical fibers OF1-OFn to output the upstream light pulses.

BPON 100 further includes a series of network end points EP1-EPn which are located at the end users, and a series of optical network terminals ONT1-ONTr that are connected to the series of optical fibers OF1-OFn at the end points EP1-EPn to provide service to the end users.

Each optical network terminal ONT receives the split downstream light pulses from a fiber OF, converts the split downstream light pulses into first local downstream signals, such as voice, data, and network signals, and second local downstream signals, such as video signals. Each optical network terminal ONT also transmits a number of end user upstream light pulses, depending on the voice, data, and network signals output by the end user.

As further shown in FIG. 1, memory 120A maintains relationally-related information, such as in table 134, on the network end points EP1-EPn. For example, memory 120A has a number of memory cells that store the active identity numbers, such as the serial numbers, of the optical network terminals ONT1-ONTr that are connected to the network end points EP1-EPn to provide service to the end users. The first downstream information output by controller 120 includes the active identity number of an optical network terminal ONT when the ONT is to be added to network 100, and when the ONT is connected to network 100.

In addition, memory 120A has a number of memory cells that stores the ranges to the optical network terminals ONTs, e.g., the distances from the OLT to the optical network terminals ONT1-ONTr, and the calculated transmission delays that have been assigned to the optical network terminals ONT1-ONTr. Other information associated with the network end point EP is also held by memory 120A such as, for example, the passwords associated with the active identity numbers, the connection type, and the level of service.

In operation, when a network end point EP is to be added to network 100, the active identity number of the optical network terminal ONT to be connected to the network end point EP to provide service to the end user is added to table 134 in a manner that establishes a relationship between the network end point EP and the active identity number of the ONT.

Controller 120 periodically outputs an identity number message that includes the active identity number of the to-be-added optical network terminal ONT. The identity number message is output onto network 100 to determine if the to-be-added optical network terminal ONT has come on line. For example, in the G.983.1 recommendation, the physical level operations, administration, and maintenance (PLOAM) ATM cells are utilized to determine if a to-be-added ONT has come on line.

When the to-be-added optical network terminal ONT is physically connected to network 100, the added optical network terminal ONT receives the identity number message, and responds to OLT 110 within the allowed time period. (A maximum period of time is allowed for an optical network terminal ONT to respond when the active identity number is output to network 100.)

Once controller 120 of OLT 110 receives the response from the added optical network terminal ONT confirming that an optical network terminal ONT with that active identity number is on the network, controller 120 determines a range to the added optical network terminal ONT.

Controller 120 determines the range by outputting a range message to the added optical network terminal ONT. The range message (which can be the same as the identity number message) includes the active identity number of the added optical network terminal ONT.

The added optical network terminal ONT receives the range message, and responds to OLT 110. The elapsed time between when the range message was sent until when a response is received from the added optical network terminal ONT is measured by controller 120. The range can then be determined knowing the average response time of an optical network terminal ONT, and the speed of the light pulses through optical fiber.

After the range to the added optical network terminal ONT has been determined, controller 120 of OLT 110 determines the transmission delay for the added optical network terminal ONT. Transmission delays are utilized to compensate for the varying distances that ONTs lie from OLT 110.

In the downstream direction (from OLT 110 to the optical network terminals ONT1-ONTr), the split downstream light pulses are received by each optical network terminal ONT. However, in the upstream direction, a time division multiple access (TDMA) protocol is utilized to avoid collisions.

With a TDMA protocol, the upstream time payload is divided into a large number of time slots which are shared by the optical network terminals ONT1-ONTr. An optical network terminal ONT receives a grant message from controller 120 in a time slot that grants the optical network terminal ONT permission to transmit. If each ONT transmitted light pulses after receiving permission, collisions could occur because the optical network terminals ONT1-ONTr typically lie a different distance away from OLT 110, and therefore have a different response time.

To prevent this from happening while increasing the available bandwidth, controller 120 calculates a transmission delay for each optical network terminal ONT based on the range of the ONT. When an optical network terminal ONT receives permission to transmit light pulses onto the network, the optical network terminal ONT must wait the transmission delay period from when the permission was received to begin transmitting.

The transmission delay allows controller 120 to account for the difference in distance-based response times by synchronizing or scheduling the end user upstream light pulses from the optical network terminals ONT1-ONTr so that the end user upstream light pulses from one optical network terminal ONT do not interfere with the end user upstream light pulses from another optical network terminal ONT.

A number of factors, such as temperature, can cause the characteristics of fiber optic cable 124 and fibers OF1-OFn to vary, thereby causing the timing of network 100 to vary. As a result, controller 120 periodically sends the range message to detect changes in the elapsed time, and adjusts the transmission delay as required.

SUMMARY OF THE INVENTION

An optical line terminal device is disclosed in accordance with an embodiment of the present invention. The optical line terminal device includes an optical transmitter to receive downstream information, and output downstream light pulses that represent the downstream information. The optical line terminal device also includes an optical receiver to receive upstream light pulses and convert the upstream light pulses into upstream information.

An optical terminal device is disclosed in accordance with an embodiment of the present invention. The optical terminal device includes optical transmitter means and optical receiver means. The optical transmitter means receive downstream information, and output downstream light pulses that represent the downstream information. The optical receiver means receive upstream light pulses and convert the upstream light pulses into upstream information. The optical terminal device additionally includes controller means that include memory means and processor means that is connected to the memory means for preparing the downstream information for the optical transmitter, and receiving the upstream information from the optical receiver. The memory means stores a first identifier and a second identifier. The first identifier represents a first optical device that is connected to an end of a single network cable. The second identifier represents a second optical device that is to be connected to the end of the single network cable after the first optical device has been removed from the end of the single network cable.

A method of operating an optical line terminal (OLT) is disclosed in accordance with an embodiment of the present invention. The method includes periodically sending a first message to an end of a single cable to be received by a first optical device, and determining whether the first optical device has failed to respond to the first message a predetermined number of times. The method also includes sending a second message to the end of the single cable to be received by a second optical device when the first optical device fails to respond the predetermined number of times. The first message includes a first identifier. The second message has a second identifier that represents the second optical device. Only one optical device is connected to the end of the single cable at a time.

A method of servicing a network is disclosed in accordance with an embodiment of the present invention. The network has a first optical device connected to an end of a single network cable to receive network traffic. The first optical device has a first identifier. The method includes associating a second identifier with the end of the single network cable so that the first optical device continues to receive network traffic. The method also includes dispatching a technician to the end of the single network cable to service the first optical device. The first optical device continues to receive network traffic until the first optical device is disconnected from the network by the technician.

The optical line terminal device also includes a controller that is connected to the optical transmitter and the optical receiver. The controller includes a memory the store a first identifier and a second identifier, and a processor that is connected to the memory to prepare the downstream information for the optical transmitter, and receive the upstream information from the optical receiver. The first identifier represents a first optical device that is connected to an end of a single network cable. The second identifier represents a second optical device that is to be connected to the end of the single network cable after the first optical device has been removed from the end of the single network cable.

A network device is disclosed in accordance with an embodiment of the present invention. The network device includes a memory to store a first identifier that represents an end of a single network cable, a second identifier that represents a first network device that is connected to the end of the single network cable, and a third identifier that represents a second network device that is connectable to the end of the single network cable. The second and third identifiers are associated with the end of the single network cable. The network device also includes a processor that is connected to the memory to generate information to be sent to the end of the single network cable.

A method of servicing a network is disclosed in accordance with an embodiment of the present invention. The network has an end of a single cable and a functioning network device that is connected to the end of the single cable. The method includes associating a replacement network device with the end of the single cable when the functioning network device is to be serviced so that the functioning network device continues to receive network information. The method also includes detecting when the functioning network device no longer receives the network information, and sending the network information to the replacement network device when the functioning network device no longer receives the network information.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 2:
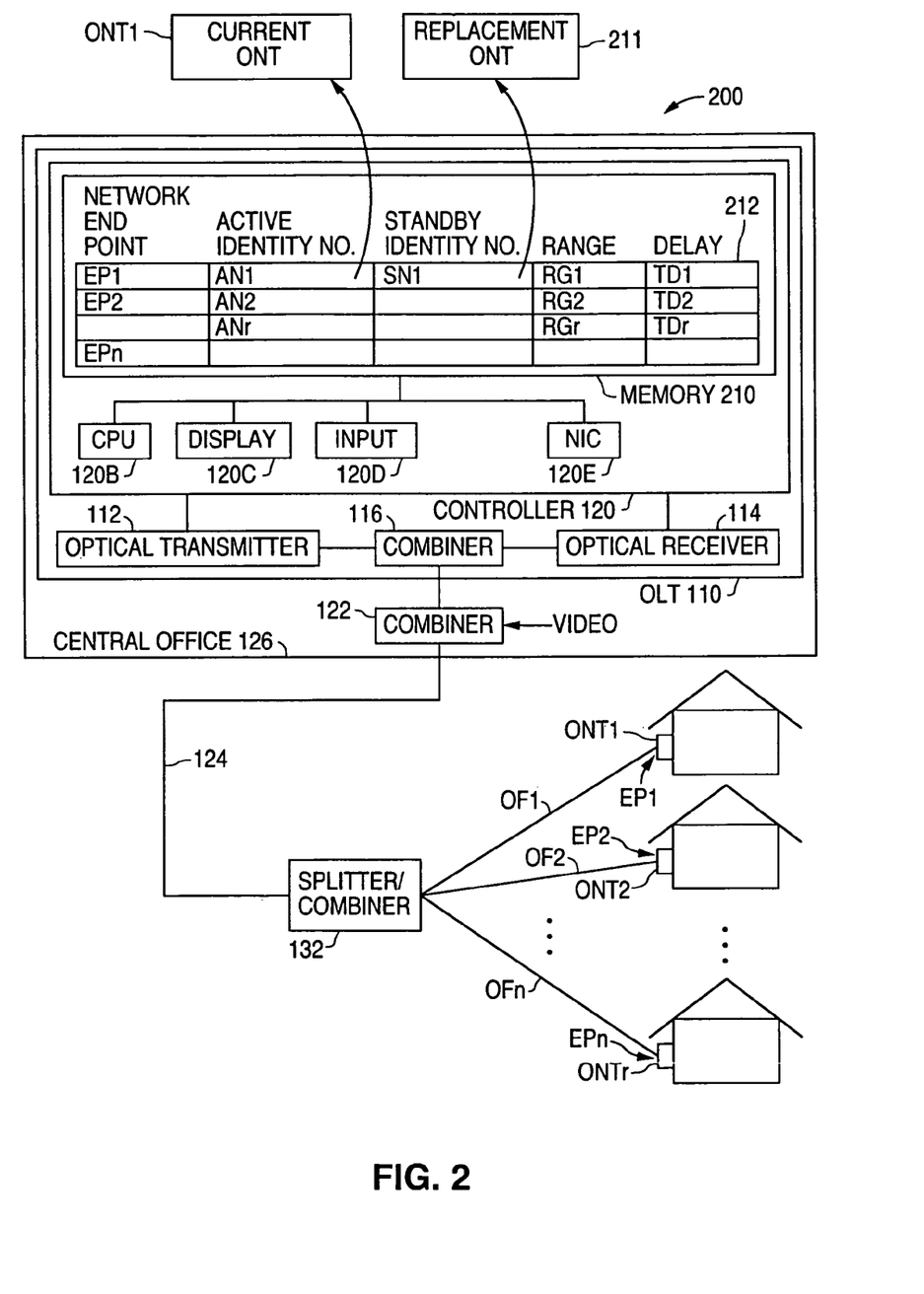
FIG. 2 is a block diagram illustrating an example of a point-to-multipoint BPON 200 in accordance with the present invention.

FIG. 2 shows a block diagram that illustrates an example of a point-to-multipoint BPON 200 in accordance with the present invention. BPON 200 is similar to BPON 100 and, as a result, incorporates BPON 100 and utilizes the same reference numerals to designate the structures which are the same in each BPON.

As shown in FIG. 2, BPON 200 includes a memory 210 that, like memory 120A, stores relationally-related information on the network end points EP1-EPn, such as the active identity numbers AN1-ANr of the optical network terminals ONT1-ONTr used at the network end points by the end users, the ranges RG1-RGr to the optical network terminals ONT1-ONTr, and the transmission delays TD1-TDr assigned to the optical network terminals ONT1-ONTr.

As further shown in FIG. 2, one way that BPON 200 differs from BPON 100 is that memory 210 has memory cells that also store and associate a standby identity number, such as standby identity number SN1, with a network end point, such as network end point EP1, when upgrades or repairs are to be performed to the ONT connected to the network end point, such as ONT1. The standby identity number, such as a serial number, represents a replacement optical network terminal 211.

Memory 210 can maintain the relationally-related information, for example, in a table 212. Other information associated with the network end point EP is also held by memory 210 such as, for example, the passwords associated with the standby identity numbers, the connection type, and the level of service.

The downstream information output by controller 120 includes an active identity number of the current optical network terminal ONT when the current ONT has experienced a partial failure, a total failure, or is to be upgraded to receive additional services. However, when the current ONT is no longer responsive, e.g., has not responded to a number of messages, to the active identity number, the numbers are switched so that the downstream information includes the standby identity number of the replacement ONT instead of the active identity number of the current ONT.

In operation, when an optical network terminal ONT is added to a network end point of network 200 to provide service to an end user, BPON 200 operates the same as BPON 100. However, when the end user wishes to upgrade their existing service, or has a partial or total service failure, BPON 200 provides a number of service-interruption advantages over BPON 100.

Figure 3:
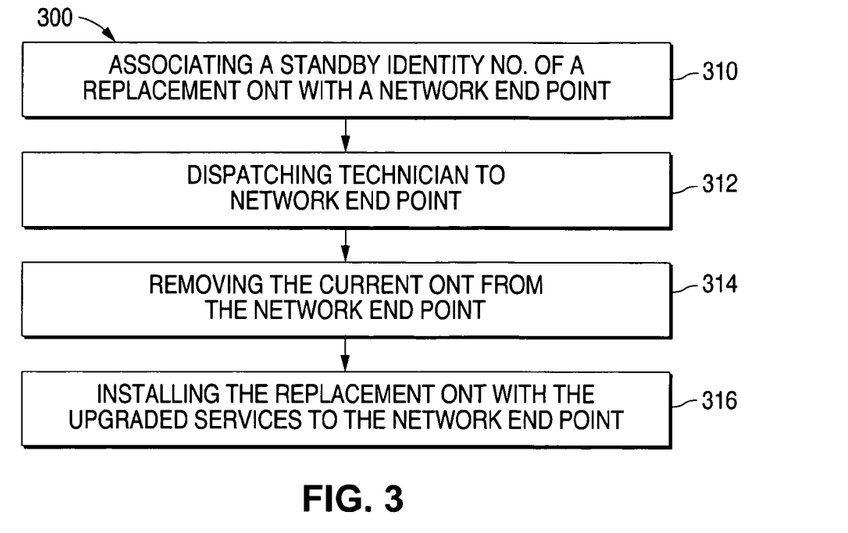
FIG. 3 is a flow chart illustrating an example of a method 300 of upgrading service in accordance with the present invention.

FIG. 3 shows a flow chart that illustrates an example of a method 300 of upgrading service in accordance with the present invention. As shown in FIG. 3, when an end user wishes to upgrade their existing service and the service provider determines that the ONT needs to be replaced, method 300 begins at step 310 by associating a standby identity number of a replacement ONT that has the upgraded services with a network end point in a manner that establishes a relationship between the network end point receiving the upgraded service, e.g., the end user, and the standby identity number.

After the standby identity number has been associated, method 300 moves to step 312 where a service technician is dispatched to the location of the network end point where the to-be-upgraded current optical network terminal (ONT) is connected. Next, method 300 moves to step 314 where the service technician removes the current ONT from the network end point, and then to step 316 to install the replacement ONT that has the upgraded service to the network end point.

Figure 4:
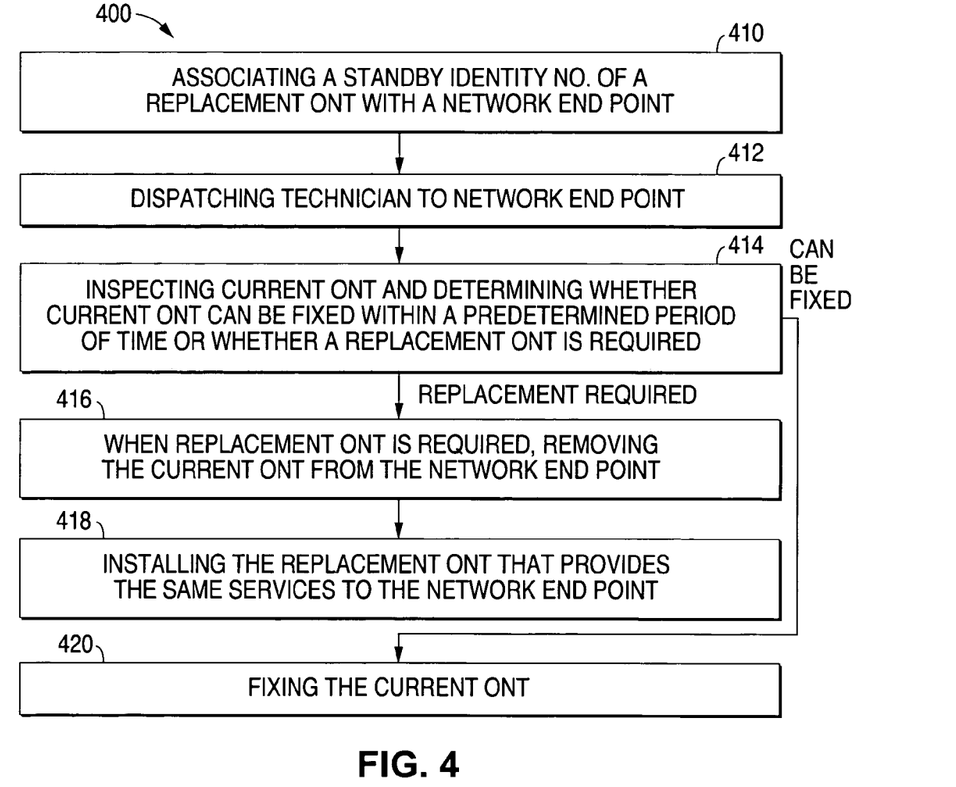
FIG. 4 is a flow chart illustrating an example of a method 400 of responding to a partial or total failure in accordance with the present invention.

FIG. 4 shows a flow chart that illustrates an example of a method 400 of responding to a partial or total failure in accordance with the present invention. As shown in FIG. 4, when an end user experiences a partial failure (where part of the service is available and part of the service is not available) or a total failure, method 400 begins at step 410 by associating a standby identity number of a replacement ONT that provides the same services with a network end point in a manner that establishes a relationship between the network end point with the service failure, e.g., the end user, and the standby identity number.

After the standby identity number has been associated, method 400 moves to step 412 where a service technician is dispatched to the location of the network end point where the to-be-fixed current optical network terminal (ONT) is connected. Next, method 400 moves to step 414 where the service technician inspects the to-be-fixed current optical network terminal (ONT) and determines whether the current ONT can be fixed within a predetermined period of time, or whether a replacement ONT is required.

When a replacement ONT is required, method 400 moves to step 416 where the current ONT is removed (e.g., by the service technician) from the network end point. Following this, method 400 moves to step 418 where a replacement ONT is connected to the network end point (e.g., by the service technician). When the current ONT can be fixed, method 400 moves from step 414 to step 420 where the current ONT is fixed (e.g., by the service technician).

Figure 5:
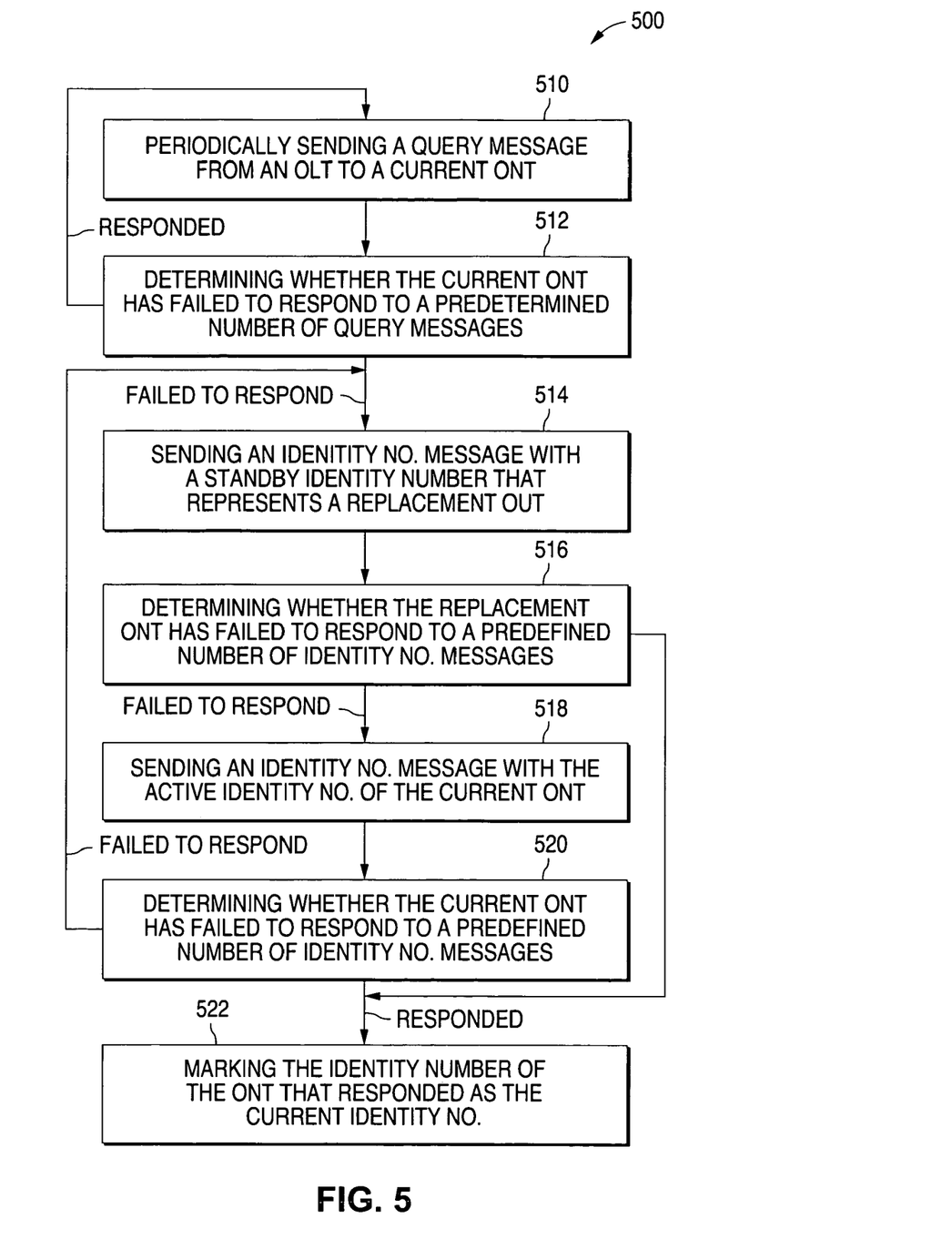
FIG. 5 is a flow chart illustrating an example of a method 500 of operating an optical line terminal in accordance with the present invention.

FIG. 5 is a flow chart that illustrates an example of a method 500 of operating an optical line terminal (OLT) in accordance with the present invention. Method 500 is implemented in software which is stored in memory 210 and executed by CPU 120B. The program instructions can be written in, for example, C++ although other languages can alternately be used.

In the present invention, method 500 begins at step 510 where an OLT periodically sends a query message, such as an identity or ranging message, to a current optical network terminal (ONT). The query message includes the active identity number of the current ONT.

Method 500 next moves to step 512 to determine whether the current ONT has failed to respond to a predetermined number of query messages. When the current ONT responds to a query message within the allowed time before the predetermined number of missed query responses has been exceeded, method 500 returns to step 510.

When the current ONT fails to respond to the predetermined number of query messages, method 500 moves to step 514 to send an identity number message with the standby identity number that represents the replacement ONT. After this, method 500 moves to step 516 to determine whether the replacement ONT has failed to respond to a predefined number of identity number messages.

When the replacement ONT fails to respond to the identity number message with the standby identity number within the allowed time before the predefined number of missed identity number responses has been exceeded, method 500 moves to step 518. In step 518, method 500 sends an identity number message that includes the active identity number of the current ONT.

After this, method 500 moves to step 520 to determine whether the current ONT has failed to respond to a predefined number of identity number messages. When the current ONT fails to respond to the predefined number of identity number messages, method 500 returns to step 514 to send an identity number message with the standby identity number that represents the replacement ONT.

When an ONT responds to the identity number message in step 516 or step 520, method 500 moves to step 522 to mark the identity number of the ONT that responded as the active identity number. Following this, method 500 continues in a conventional manner, to range the current ONT and determine a transmission delay.

The present invention increases upgrade and repair flexibility while significantly reducing the amount of time that service to an end user is interrupted. As an example, to upgrade service with BPON 100, a replacement active identity number of a replacement ONT that provides the upgraded service is entered into table 134 of OLT 110 to replace the active identity number of the current ONT.

Shortly after the replacement active identity number of the replacement ONT has been entered, the end user looses the current services until the replacement ONT that provides the upgraded-services has been physically installed because the active identity numbers in the memory of the OLT and the current ONT no longer match. This procedure commonly results in hours of lost service between when the active identity numbers are changed and the replacement ONT is installed.

To respond to partial service failures with BPON 100, a decision must be reached before a service call is made whether to replace, or attempt an on-site fix of, the optical network terminal ONT. In order to minimize the number of hours of service interruption, the current ONT is often replaced with the idea that ONTs requiring only simple fixes will be reintroduced into the mix of replacement ONTs. Similarly, to respond to a total service failure with BPON 100, the current ONT is often replaced.

As a result, when the replacement active identity number of the replacement ONT is entered into table 134 of OLT 110 to replace the active identity number of the current ONT, the end user looses the partial service that was available until the replacement ONT is physically installed because the active identity numbers in the memory of the OLT and the current ONT no longer match.

As above, this commonly results in hours of lost service between when the active identity numbers are changed and the replacement ONT is installed. The hours of lost service can be reduced if employees at the central office and the service technician coordinate their tasks so that the active identity numbers are changed just before the current ONT is replaced. This coordination, however, presents a significant staffing requirement, and may not be possible if the technician is unable to communicate with the central office employees (e.g., the cell phone of the service technician is out of a service area).

In the present invention, however, the end user continues to receive the current service when upgrading services, and the partial service when part of the service has failed, up to the point where the service technician begins to work on the ONT to upgrade the ONT, fix the ONT, or replace the ONT. Thus, service interruptions are substantially reduced.

To upgrade service with BPON 200, the identity number of the replacement ONT that provides the upgraded service is entered into memory 210 of OLT 110 as the standby identity number. Because memory 210 supports an active identity number and a standby identity number, the present invention allows the end user to continue to receive service until the moment the current ONT is physically disconnected from the network.

Thus, if 45 minutes are required to physically connect the replacement ONT that has the upgraded service, the end user would be without service for 45 minutes as opposed to a number of hours because the present invention allows controller 120 of OLT 110 to immediately recognize the standby identity number.

To respond to partial or total service failures with BPON 200, the identity number of the replacement ONT is entered into memory 210 of OLT 110 as the standby identity number. Because memory 210 supports an active identity number and a standby identity number, the present invention allows the end user to continue to receive partial service until the moment the current ONT is physically disconnected from the network.

If the fix is a simple fix, the service technician can simply fix the current ONT. In addition, if something other than the ONT has failed, this can be fixed instead of replacing the ONT. As a result, the present invention eliminates the time required to install a replacement ONT, eliminates the replacement of a functioning ONT, and maintains the stock of ONTs that are available for replacement. Because memory 210 supports an active identity number and a standby identity number, the present invention allows the end user to reconnect with the current ONT.

Thus, if ten minutes are required to fix the current ONT by, for example, replacing a sub-module, the end user would be without service for ten minutes as opposed to hours because the present invention allows controller 120 of OLT 110 to recognize the active identity number of the current ONT.

On the other hand, if the fix is not a simple fix and a significant failure has occurred, the present invention allows a replacement ONT to be installed and service restored in approximately the same amount of time that is required to install a replacement ONT with upgraded services.

Another, although less frequent, advantage of the present invention is that if a replacement ONT with upgraded services can not be installed for some reason after installation has been attempted, the original service is immediately available after reinstallation of the current ONT because the present invention allows controller 120 of OLT 110 to again recognize the active identity number of the current optical network terminal ONT. With BPON 100, the end user would be without service for the time required to re-enter the original active identity number.

It should be understood that the above descriptions are examples of the present invention, and that various alternatives of the invention described herein may be employed in practicing the invention. For example, the present invention is not limited to BPONs, but can be used with other optical networks that are similarly configured. Thus, it is intended that the following claims define the scope of the invention and that structures and methods within the scope of these claims and their equivalents be covered thereby.

What is claimed is:

1. A method of operating an optical line terminal (OLT), the method comprising:

periodically sending a first message to a first optical device connected to an end of a single cable, the first message including a first identifier;

determining whether the first optical device has failed to respond to the first message a predetermined number of times;

sending a second message to the end of the single cable when the first optical device fails to respond the predetermined number of times, the second message having a second identifier that represents a second optical device, the second optical device being connected to the end of the single cable after the first optical device has been physically removed from the end of the single cable;

determining if the second optical device has responded to the second message with the second identifier; and sending a third message with the first identifier that represents the first optical device when the second optical device fails to respond to a number of second messages.

2. The method of claim 1 and further comprising marking the second identifier as an active identification number when the second optical device responds to the second message.

3. The method of claim 1 and further comprising:

determining if the first optical device has responded to the third message with the first identifier; and marking the first identifier as an active identification number when the first optical device responds to the third message.

4. The method of claim 1 and further comprising:
determining if the first optical device has responded to the third message with the first identifier; and
sending the second message with the second identifier that represents the second optical device when the first optical device fails to respond to a number of third messages.

5. The method of claim 4 and further comprising:
associating the second identifier with the end of the single cable so that the first optical device continues to receive network traffic, the second optical device being a replacement for the first optical device, the second optical device not being connected to the end of the single cable when the second identifier is associated with the end of the single cable; and
dispatching a technician to the end of the single cable to service the first optical device, the first optical device continuing to receive network traffic until the first optical device is disconnected from the end of the single cable by the technician.

6. The method of claim 5 and further comprising:
removing the first optical device from the end of the single cable; and
installing the second optical device to the end of the single cable.

7. The method of claim 5 and further comprising:
inspecting the first optical device and determining whether the first optical device can be fixed within a predefined period of time;
fixing the first optical device when the first optical device can be fixed within the predefined period of time;
removing the first optical device from the end of the single cable when the first optical device can not be fixed within the predefined period of time; and
installing the second optical device to the end of the single cable after the first optical device has been removed.

8. The method of claim 5 wherein the first optical device is fully functioning.

9. The method of claim 5 wherein the first optical device is only partially functioning.

10. The method of claim 9 and further comprising:
removing the first optical device from the end of the single cable after the second optical device has been associated to the first optical device;
reinstalling the first optical device to the end of the single cable if full functionality can be provided with the first optical device within a predetermined period of time; and
installing the second optical device to the end of the single cable if full functionality can not be provided with the first optical device within a predetermined period of time.

11. The method of claim 1 wherein the first optical device is an optical network terminal.

12. The method of claim 11 wherein the second optical device is an optical network terminal.

* * * * *

UNITED STATES PATENT AND TRADEMARK OFFICE
CERTIFICATE OF CORRECTION

PATENT NO. : 7,274,881 B2  Page 1 of 1
APPLICATION NO. : 10/617982
DATED : September 25, 2007
INVENTOR(S) : Hochbaum It is certified that error appears in the above-identified patent and that said Letters Patent is hereby corrected as shown below:

Column 5, Line 11, insert paragraph --The optical line terminal device also includes a controller that is connected to the optical transmitter and the optical receiver. The controller includes a memory to store a first identifier and a second identifier, and a processor that is connected to the memory to prepare the downstream information for the optical transmitter, and receive the upstream information from the optical receiver. The first identifier represents a first optical device that is connected to an end of a single network cable. The second identifier represents a second optical device that is to be connected to the end of the single network cable after the first optical device has been removed from the end of the single network cable.--

Column 5, Line 58, cancel the paragraph beginning with "The optical line terminal device" through and ending with "single network cable." in Column 6, Line 2.

Signed and Sealed this

Eighteenth Day of December, 2007

JON W. DUDAS
*Director of the United States Patent and Trademark Office*